(12) United States Patent
Morrow

(10) Patent No.: US 12,385,738 B2
(45) Date of Patent: Aug. 12, 2025

(54) SYSTEMS AND METHODS OF GENERATING A SELECTIVELY LIMITED AIRCRAFT STATIC PRESSURE INDICATION

(71) Applicant: THE BOEING COMPANY, Arlington, VA (US)

(72) Inventor: Jonathan C. Morrow, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 376 days.

(21) Appl. No.: 18/299,251

(22) Filed: Apr. 12, 2023

(65) Prior Publication Data
US 2024/0344826 A1 Oct. 17, 2024

(51) Int. Cl.
*G01C 5/00* (2006.01)
*B64D 43/00* (2006.01)
(Continued)

(52) U.S. Cl.
CPC ............ *G01C 5/005* (2013.01); *B64D 43/00* (2013.01); *G01P 5/00* (2013.01); *G01P 5/14* (2013.01)

(58) Field of Classification Search
CPC ........ B64D 43/02; B64D 15/20; B64D 43/00; B64D 15/12; B64D 1/18; B64D 1/20; B64D 15/16; B64D 15/22; B64D 2033/0286; B64D 33/02; B64D 45/00; B64D 33/08; G01C 23/005; G01C 5/06; G01C 13/006; G01C 21/16; G01C 23/00; G01C 21/005; G01C 13/008; G01C 15/002; G01C 9/34; G01C 21/185; G01C 9/00; G01P 13/025; G01P 5/165; G01P 13/02; G01P 5/14; G01P 5/16; G01P 5/00; G01P 5/02; G01P 5/12; G01P 5/245; G01P 21/025; G01P 5/07; G01P 5/04; G01P 1/02; G01P 1/08; G01P 5/10; G01P 5/06; G01P 5/18; G01P 5/26;
(Continued)

(56) References Cited

U.S. PATENT DOCUMENTS 5,781,126 A 7/1998 Paterson et al.
8,570,192 B2 * 10/2013 McLoughlin ............ G08G 5/21
701/14
(Continued)

FOREIGN PATENT DOCUMENTS

CA 3034728 A1 * 11/2019 ................ G01P 5/16
EP 3581906 A1 12/2019
WO WO-2023146509 A1 * 8/2023 ........... G06F 1/1684

OTHER PUBLICATIONS

Extended European Search Report for application No. 24154609.2 dated Jul. 29, 2024, pp. 1-11.
(Continued)

*Primary Examiner* — Andre J Allen
(74) *Attorney, Agent, or Firm* — Moore IP Law

(57) ABSTRACT

A device includes circuitry configured to, during a first operation mode, generate a static pressure indication independently of a static pressure measurement limit. The circuitry is also configured to, during a second operation mode, generate the static pressure indication based on the static pressure measurement limit. The circuitry is further configured to generate a standby altitude indication based on the static pressure indication.

20 Claims, 7 Drawing Sheets

(51) Int. Cl.
    *G01P 5/00* (2006.01)
    *G01P 5/14* (2006.01)
(58) Field of Classification Search
    CPC .......... G01P 13/045; G01P 5/005; G01P 5/08;
        G01P 21/00; G01P 3/62; G01P 5/175;
        G01P 5/24; G01P 15/00; G01P 15/036;
        G01P 5/006; G01P 5/083; G01P 5/086;
        G01P 5/241; G01P 7/00; G01P 5/001
    USPC ...................................................... 73/170.02
    See application file for complete search history.

(56) References Cited

U.S. PATENT DOCUMENTS

| | | | |
|---|---|---|---|
| 10,591,293 B2* | 3/2020 | Gadicherla | G01C 25/00 |
| 10,822,109 B2* | 11/2020 | Luo | G01S 19/13 |
| 11,181,934 B1* | 11/2021 | P R | G08G 5/76 |
| 11,630,016 B2* | 4/2023 | Rémy | F01D 25/02 |
| | | | 73/112.01 |
| 2003/0233175 A1 | 12/2003 | Giraudy et al. | |

OTHER PUBLICATIONS

"Ground Effect on Takeoff," Flight-Study.com, hhttps://www.flight-study.com/2019/09/ground-effect-on-takeoff.html, retrieved Apr. 12, 2013, pp. 1-4.

\* cited by examiner

SYSTEMS AND METHODS OF GENERATING A SELECTIVELY LIMITED AIRCRAFT STATIC PRESSURE INDICATION

FIELD OF THE DISCLOSURE

The present disclosure is generally related to generating a selectively limited static pressure indication of an aircraft.

BACKGROUND

A standby altimeter is a backup instrument used to indicate an aircraft's altitude in case of a failure or malfunction of a primary altimeter. Standby altimeters are designed to be simple, reliable, and easy to read, often using an analog display with a single pointer or a digital display. Standby altimeters are driven by a static pressure measurement system.

Ground effect is a phenomenon that occurs when an aircraft is moving at high velocity on the ground or flying at a low altitude, typically within one wingspan of the ground or other surface. The effect is caused by the interference between the wings and the ground, which can cause a reduction in the induced drag and an increase in lift. Ground effect can result in an increase in the static pressure measurement under the wings, which can affect altitude measurement during takeoff.

To compensate for ground effect, aircraft manufacturers typically provide calibration procedures for the primary altimeter that take into account the expected changes in static pressure during takeoff. The standby altimeter, that is simple by design, can output an inaccurate altitude measurement corresponding to the increase in the static pressure measurement due to the ground effect during takeoff. Increasing accuracy of the standby altimeter can help pilots to maintain situational awareness and and reduce the likelihood of a potentially hazardous high-speed rejected takeoff.

SUMMARY

In a particular implementation, a device includes circuitry configured to, during a first operation mode, generate a static pressure indication independently of a static pressure measurement limit. The circuitry is also configured to, during a second operation mode, generate the static pressure indication based on the static pressure measurement limit. The circuitry is further configured to generate a standby altitude indication based on the static pressure indication.

In another particular implementation, an aircraft includes circuitry configured to, during a first operation mode, generate a static pressure indication independently of a static pressure measurement limit. The circuitry is also configured to, during a second operation mode, generate the static pressure indication based on the static pressure measurement limit. The circuitry is further configured to generate a standby altitude indication based on the static pressure indication.

In another particular implementation, a method includes generating, at circuitry, a static pressure indication selectively based on a static pressure measurement limit. The method also includes generating, at the circuitry, a standby altitude indication based on the static pressure indication.

The features, functions, and advantages described herein can be achieved independently in various implementations or may be combined in yet other implementations, further details of which can be found with reference to the following description and drawings.

DETAILED DESCRIPTION

Figure 1A:
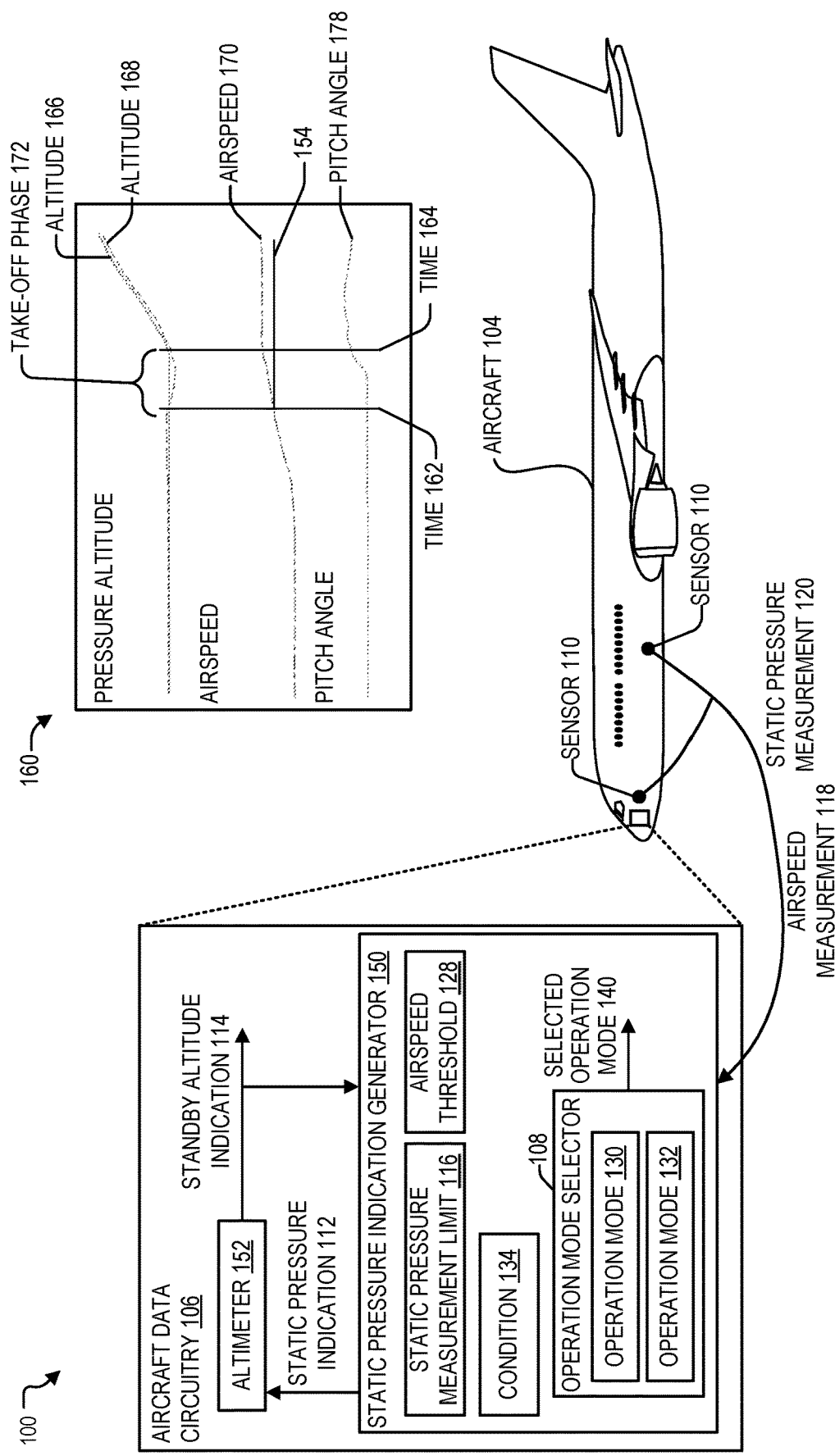
FIG. 1A is a diagram that illustrates a system including aircraft data circuitry configured to generate a static pressure indication of an aircraft.

Aspects disclosed herein present systems and methods for aircraft static pressure indication generation. Ground effect can result in an increase in the static pressure measurement during take-off. An altimeter that uses the static pressure measurement generates a decreased altitude indication due to the ground effect.

Aircraft data circuitry includes a static pressure indication generator coupled to an altimeter. A higher than threshold airspeed can indicate a takeoff phase during which ground effect is typically experienced. During the takeoff phase, the static pressure measurement received by the static pressure indication generator from a static pressure sensor is likely increased due to the ground effect. The static pressure indication generator, in response to detecting a higher than threshold airspeed, switches from a first operation mode to a second operation mode. During the first operation mode, the static pressure indication generator outputs a static pressure indication that is based on the static pressure measurement that is being received. During the second operation mode, the static pressure indication generator outputs a static pressure indication that is based on a previously stored static pressure measurement. The altimeter generates an altitude indication that is based on the static pressure indication. Switching to the second operation mode thus prevents output of a static pressure indication that is based on the increased static pressure measurement due to ground effect, thereby increasing accuracy of the altitude indication.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation.

As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter.

Figure 6:
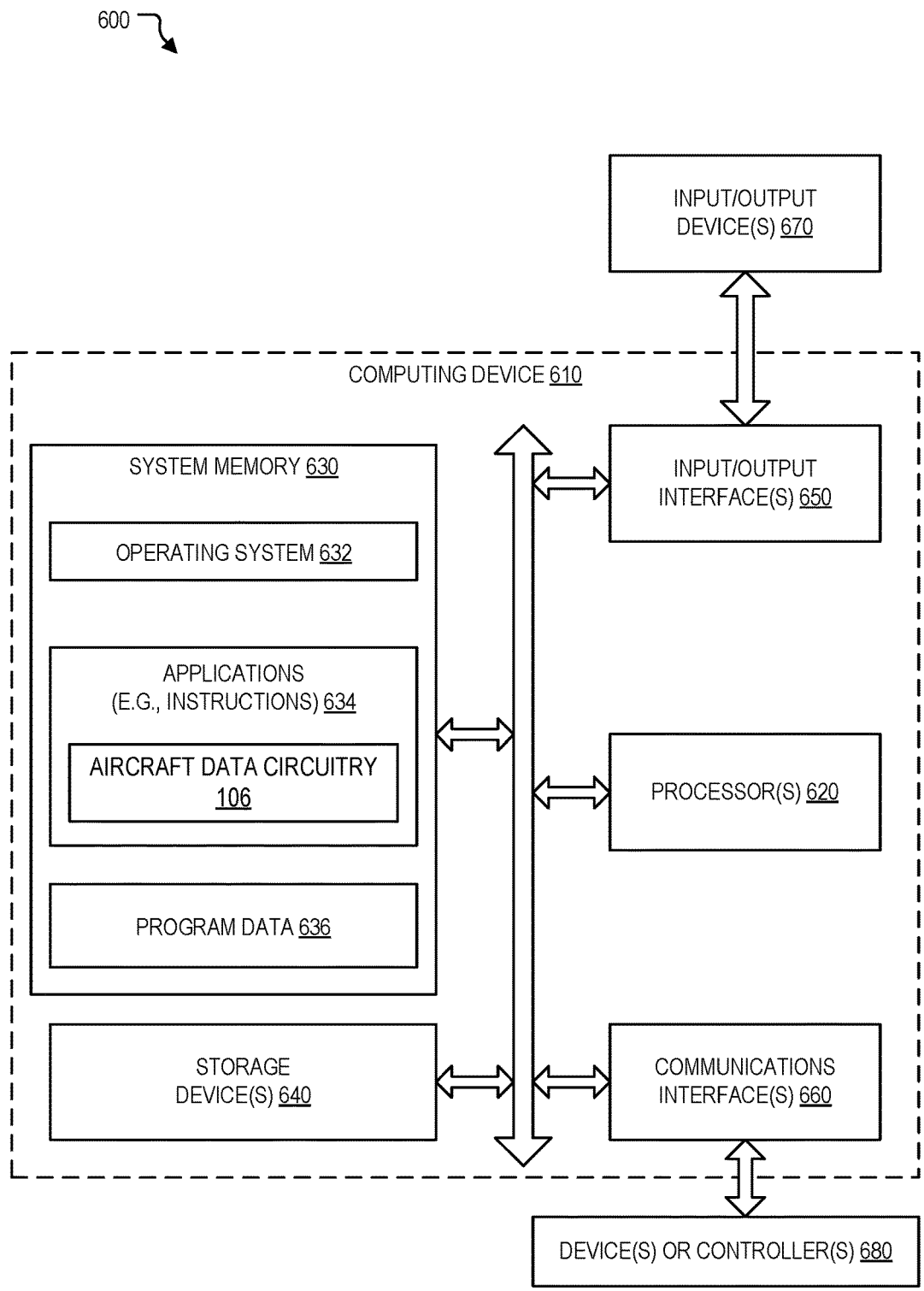
FIG. 6 is a block diagram of a computing environment including a computing device configured to support aspects of computer-implemented methods and computer-executable program instructions (or code) according to the present disclosure.

As used herein, various terminology is used for the purpose of describing particular implementations only and is not intended to be limiting. For example, the singular forms "a." "an," and "the" are intended to include the plural forms as well, unless the context clearly indicates otherwise. Further, some features described herein are singular in some implementations and plural in other implementations. To illustrate, FIG. 6 depicts a computing device 610 including one or more processors ("processor(s)" 620 in FIG. 6), which indicates that in some implementations the computing device 610 includes a single processor 620 and in other implementations the computing device 610 includes multiple processors 620. For ease of reference herein, such features are generally introduced as "one or more" features, and are subsequently referred to in the singular or optional plural (as typically indicated by "(s)") unless aspects related to multiple of the features are being described.

The terms "comprise." "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first." "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using." "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1A depicts an example of a system 100 that is configured to generate a static pressure indication of an aircraft 104. The aircraft 104 includes sensors 110 coupled to aircraft data circuitry 106.

The sensors 110 are configured to generate sensor data. In some examples, one or more of the sensors 110 can generate the sensor data continuously, at various time intervals, or a combination thereof. The sensors 110 include an airspeed sensor, a static pressure sensor, one or more additional sensors, or a combination thereof. In a particular aspect, the sensors 110 include a pitot static tube system. The airspeed sensor is configured to generate an airspeed measurement 118. The static pressure sensor is configured to generate a static pressure measurement 120.

FIG. 1A includes an example 160 of a pitch angle 178, an airspeed 170, an altitude 166 (e.g., actual altitude), and an altitude 168 (corresponding to the static pressure measurement 120) of the aircraft 104 during a beginning portion of a flight. The example 160 illustrates a difference between the altitude 166 and the altitude 168 during a take-off phase 172 caused due to ground effect.

The take-off phase 172 starts when the airspeed 170 starts to ramp up (e.g., a few minutes prior to lift-off) and ends when the airspeed 170 starts leveling off. For example, the take-off phase 170 starts prior to a time 162 and ends at a time 164. According to some implementations, an airspeed threshold 128 corresponds to an estimated airspeed associated with the start of the take-off phase 172. In some examples, the airspeed threshold 128 is greater than the estimated airspeed. For example, at the time 162 subsequent to the start of the take-off phase 172, the airspeed 170 has a value 154 (e.g., as indicated by the airspeed measurement 118) that is equal to the airspeed threshold 128. To illustrate, the time 162 can correspond to a point in the take-off phase 170 that pilots are typically committed to continuing with the take-off. In some other examples, the airspeed threshold 128 (e.g., 80 knots) can be less than (e.g., within 25 knots of) the estimated airspeed (e.g., 100 knots) to enable switching operation modes prior to the start of the take-off phase 172. In a particular aspect, the airspeed threshold 128 is based on a user input, historical flight data, a configuration setting, default data, or a combination thereof. The static pressure indication generator 150 is configured to generate a static pressure indication 112 selectively based on a static pressure measurement limit 116, as further described with reference to FIG. 2. The static pressure indication generator 150 includes an operation mode selector 108 that is configured to select, based on a comparison of the airspeed measurement 118 and the airspeed threshold 128, one of an operation mode 130 or an operation mode 132 as a selected operation mode 140 of the static pressure indication generator 150. The static pressure indication generator 150 is configured to, during the selected operation mode 140 corresponding to the operation mode 130, generate the static pressure indication 112 independently of the static pressure measurement limit 116. As another example, the static pressure indication generator 150 is configured to, during the selected operation mode 140 corresponding to the operation mode 132, generate the static pressure indication 112 based on the static pressure measurement limit 116.

The altimeter 152 is configured to generate a standby altitude indication 114 based on the static pressure indication 112 (e.g., a standby static pressure indication). According to some aspects, the altimeter 152 applies a formula to at least the static pressure indication 112 to generate the standby altitude indication 114. In a particular implementation, the formula corresponds to a standard atmosphere formula given by: altitude (in feet)=145366.45*(1−(static pressure/ 1013.25)^(0.190284)), where "altitude" corresponds to the standby altitude indication 114 and the "static pressure" corresponds to the static pressure indication 112. In other implementations, the altimeter 152 can apply another formula that is based on the static pressure indication 112. In some examples, the other formula is also based on one or more additional measurements, such as temperature, humidity, etc.

While the selected operation mode 140 corresponds to the operation mode 130, the static pressure indication generator 150 generates the static pressure indication 112 based on the static pressure measurement 120 that is being received and independently of the static pressure measurement limit 116, as further described with reference to FIG. 2. While the selected operation mode 140 corresponds to the operation mode 130, the static pressure indication generator 150 updates the static pressure measurement limit 116 based on the static pressure measurement 120. In a particular aspect, the static pressure indication generator 150 updates the static pressure measurement limit 116 based on a predetermined count of most recent static pressure measurements 120. For example, the static pressure measurement limit 116 can correspond to a running average (e.g., mean, median, or mode) of the predetermined count of most recent static pressure measurements 120. As another example, the static pressure measurement limit 116 can corresponding to a highest value or a lowest value of the predetermined count of most recent static pressure measurements 120. According to some implementations, the predetermined count is based on default data, a configuration setting, a user input, or a combination thereof.

The operation mode selector 108, in response to determining that the airspeed measurement 118 is greater than the airspeed threshold 128 (e.g., 80 knots) while the selected operation mode 140 corresponds to the operation mode 130, selects the operation mode 132 as the selected operation mode 140. In a particular aspect, the airspeed measurement 118 greater than the airspeed threshold 128 corresponds to the take-off phase 172 during which ground effect is likely.

While the selected operation mode 140 corresponds to the operation mode 132, the static pressure indication generator 150 refrains from updating the static pressure measurement limit 116. To illustrate, the static pressure measurement limit 116 corresponds to the static pressure measurement 120 stored when the selected operation mode 140 corresponded to the operation mode 130 (e.g., while the airspeed measurement 118 was less than or equal to the airspeed threshold 128).

While the selected operation mode 140 corresponds to the operation mode 132, the static pressure indication generator 150 generates the static pressure indication 112 based on the static pressure measurement limit 116, as further described with reference to FIG. 2. During the operation mode 132, the static pressure measurement limit 116 corresponds to a static pressure ceiling of the static pressure indication 112. For example, while the selected operation mode 140 corresponds to the operation mode 132, the static pressure indication generator 150 outputs the lower one of the static pressure measurement limit 116 or the static pressure measurement 120 as the static pressure indication 112. To illustrate, if the static pressure measurement 120 is lower than the static pressure measurement limit 116, the static pressure measurement 120 is likely to be accurate and is output as the static pressure indication 112.

The altimeter 152 generates the standby altitude indication 114 based on the static pressure indication 112. In an example, while the selected operation mode 140 has the operation mode 132, the standby altitude indication 114 has an altitude floor corresponding to the static pressure ceiling.

The operation mode 132 remains the selected operation mode 140 until a condition 134 is satisfied, as further described with reference to FIG. 2. For example, the operation mode selector 108, based on determining that the condition 134 is satisfied, transitions from the operation mode 132 to the operation mode 130 as the selected operation mode 140. According to some implementations, the condition 134 is based on default data, a configuration setting, a user input, or a combination thereof. In some examples, the operation mode selector 108 determines that the condition 134 is satisfied based on determining that a threshold time has elapsed since transitioning to the operation mode 132. To illustrate, the threshold time (e.g., 60 seconds) corresponds to an expected duration of the take-off phase 172 that is typically associated with ground effect.

According to some implementations, the take-off phase 172 has likely ended when a difference between a detected altitude of the aircraft and the altitude floor is greater than a difference threshold (e.g., 200 feet). In some examples, the operation mode selector 108 determines that the condition 134 is satisfied based on determining that a difference threshold is less than or equal to a difference between the standby altitude indication 114 (e.g., a detected altitude) and an altitude (e.g., an altitude floor) corresponding to the static pressure measurement limit 116. In some examples, the operation mode selector 108 determines that the condition 134 is satisfied based on determining that a difference threshold is less than or equal to a difference between the static pressure indication 112 (e.g., a detected static pressure corresponding to the static pressure measurement 120) and the static pressure measurement limit 116 (e.g., corresponding to the static pressure ceiling).

A technical advantage of switching to the operation mode 132 when the airspeed measurement 118 is greater than the airspeed threshold 128 can include preventing output of the static pressure indication 112 based on the static pressure measurement 120 that is increased due to ground effect, thereby increasing accuracy of the standby altitude indication 114. Increasing accuracy of the altimeter 152 can help pilots to maintain situational awareness and reduce the likelihood of a potentially hazardous high-speed rejected takeoff. According to some implementations, the altimeter 152 generates the standby altitude indication 114 solely based on one or more airspeed measurements 118 obtained from an airspeed sensor of the sensors 110, one or more static pressure measurements 120 obtained from a static pressure sensor of the sensors 110, or a combination thereof. For example, the standby altitude indication 114 is not based on any additional sensor data. The altimeter 152 thus retains the simplicity associated with a standby altimeter while providing more accurate standby altitude indications 114.

In some implementations, the static pressure indication generator 150, the altimeter 152, the aircraft data circuitry 106, or a combination thereof, can be implemented at least in part by a processor executing instructions. The processor can be implemented as a single processor or as multiple processors, such as in a multi-core configuration, a multi-processor configuration, a distributed computing configuration, a cloud computing configuration, or any combination thereof. In some implementations, one or more portions of the static pressure indication generator 150, the altimeter 152, the aircraft data circuitry 106, or a combination thereof, are implemented using dedicated hardware, firmware, or a combination thereof.

Although the altimeter 152 and the static pressure indication generator 150 are depicted as separate components, in other implementations the described functionality of two or more of the altimeter 152 and the static pressure indication generator 150 can be performed by a single component. In some implementations, the static pressure indication generator 150, the altimeter 152, the aircraft data circuitry 106, or a combination thereof, include analog circuitry, one or more processors, or a combination thereof. In some implementations, the static pressure indication generator 150, the altimeter 152, the aircraft data circuitry 106, or a combination thereof, include a line replaceable unit (LRU). For example, the static pressure indication generator 150, the altimeter 152, the aircraft data circuitry 106, or a combination thereof, can be integrated in an LRU configured to provide standby flight data indications (e.g., the static pressure indication 112, the standby altitude indication 114, or both).

In some implementations, each of the static pressure indication generator 150 and the altimeter 152 can be represented in hardware, such as via an application-specific integrated circuit (ASIC) or a field-programmable gate array (FPGA), or the operations described with reference to the elements may be performed by a processor executing computer-readable instructions.

Figure 1B:
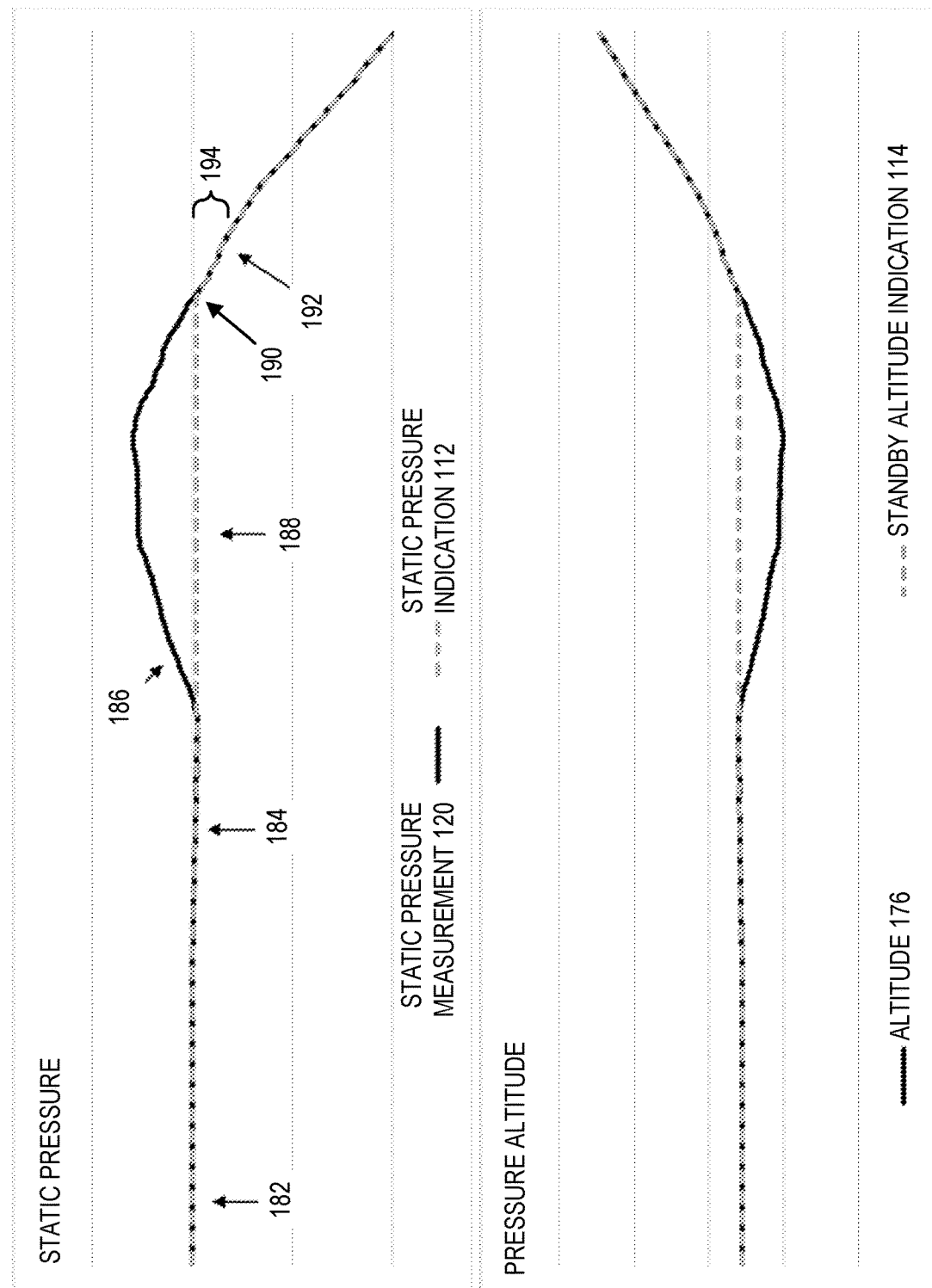
FIG. 1B is a diagram of a particular example of a static pressure indication and corresponding altitude indication that can be generated by the system of FIG. 1A.

FIG. 1B illustrates an example 180 of the static pressure indication 112 and the standby altitude indication 114 that can be generated by the system 100 of FIG. 1A.

At a time 182, the aircraft 104 of FIG. 1A initiates a takeoff roll. The selected operation mode 140 is initialized to the operation mode 130 and the static pressure indication 112 is the same as the static pressure measurement 120. An altitude 176 (corresponding to the static pressure measurement 120) is the same as the standby altitude indication 114 (corresponding to the static pressure indication 112).

At a time 184, the airspeed measurement 118 of FIG. 1A is greater than or equal to the airspeed threshold 128. The static pressure indication generator 150 captures (e.g., stores) the static pressure measurement limit 116 corresponding to the static pressure measurement 120 and the operation mode selector 108 transitions from the operation mode 130 to the operation mode 132 as the selected operation mode 140.

At a time 186, as the aircraft 104 continues accelerating, ground effect causes the static pressure measurement 120 to increase. The static pressure indication generator 150 outputs the static pressure measurement limit 116 (e.g., the lower of the static pressure measurement 120 or the static pressure measurement limit 116) as the static pressure indication 112. The standby altitude indication 114 (corresponding to the static pressure indication 112) is greater than the altitude 176 (corresponding to the static pressure measurement 120), thereby disregarding the ground effect errors of the static pressure measurement 120.

At a time 186 and a time 188, the static pressure indication generator 150 continues to output the static pressure measurement limit 116 (e.g., the lower of the static pressure measurement 120 or the static pressure measurement limit 116). The standby altitude indication 114 (corresponding to the static pressure indication 112) remains greater than the altitude 176 (corresponding to the static pressure measurement 120).

After a time 190, as the aircraft 104 continues to gain altitude, the ground effect is reduced (e.g., absent) and the static pressure measurement 120 gets lower than the static pressure measurement limit 116. The static pressure indication generator 150 outputs the static pressure measurement 120 (e.g., the lower of the static pressure measurement 120 or the static pressure measurement limit 116) as the static pressure indication 112. The standby altitude indication 114 (corresponding to the static pressure indication 112) is the same as the altitude 176 (corresponding to the static pressure measurement 120).

At a time 192, the operation mode selector 108, in response to detecting a condition 134, transitions from the operation mode 132 to the operation mode 130 as the selected operation mode 140, as described with reference to FIG. 1A. For example, the operation mode selector 108 detects the condition 134 in response to determining that a difference 194 between the static pressure indication 112 and the static pressure measurement limit 116 is greater than a change threshold. To illustrate, the condition 134 is detected based on determining that the static pressure indication 112 is less than the static pressure measurement limit 116 by at least the change threshold. The criteria for detecting the condition 134 are selected such that the condition 134 is detected at the time 192 that is subsequent to the take-off phase 172 during which ground effect is expected.

In some examples, the operation mode selector 108 detects the condition 134 in response to determining that a difference between the standby altitude indication 114 and an altitude floor corresponding to the static pressure measurement limit 116 is greater than a change threshold. To illustrate, the condition 134 is detected based on determining that the standby altitude indication 114 is greater than the altitude floor by at least the change threshold. In some examples, the operation mode selector 108 detects the condition 134 in response to determining that at least a threshold time has elapsed since transitioning to the operation mode 132.

A technical advantage of switching to the operation mode 132 can include enabling output of the static pressure indication 112 that is based on the static pressure measurement limit 116 instead of the static pressure measurement 120 that is increased due to ground effect, thereby enabling output of the standby altitude indication 114 having greater accuracy (e.g., does not indicate a decrease due to the ground effect).

Figure 2:
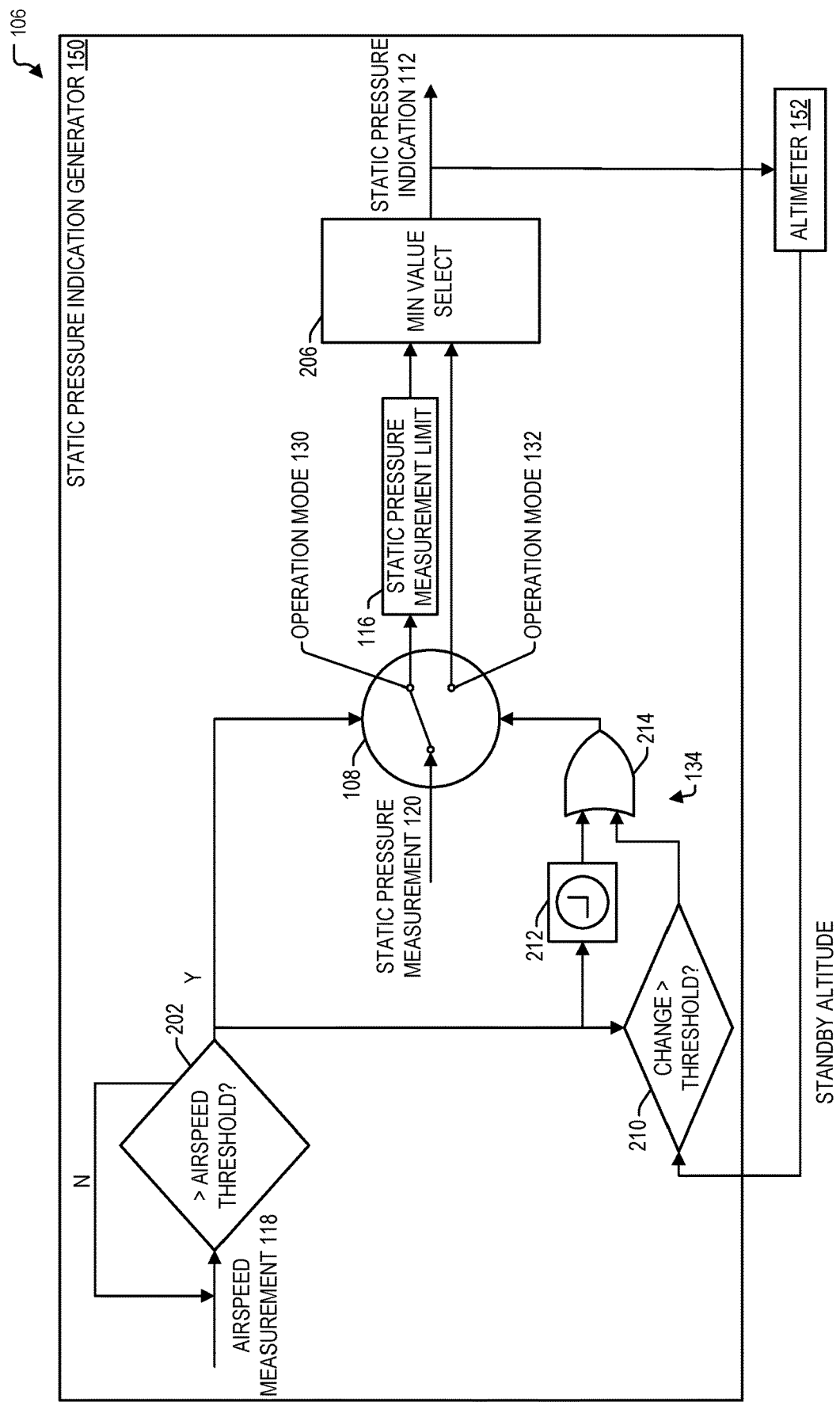
FIG. 2 is a diagram of a particular implementation of the aircraft data circuitry of the system of FIG. 1A.

FIG. 2 illustrates a particular implementation of the aircraft data circuitry 106. The aircraft data circuitry 106 includes the static pressure indication generator 150 coupled to the altimeter 152.

In FIG. 2, the operation mode selector 108 is illustrated as including a switch in a first position indicating that the operation mode 130 is selected as the selected operation mode 140. During the operation mode 130, the static pressure indication generator 150 updates the static pressure measurement limit 116 based on the static pressure measurement 120, as described with reference to FIG. 1A, and outputs the static pressure measurement 120 as a static pressure indication 112. In some examples, the static pressure indication generator 150 is configured to, during the operation mode 130, perform a minimum value select 206 to select the static pressure measurement limit 116 as the static pressure indication 112. To illustrate, during the operation mode 130, performing the minimum value select 206 corresponds to selecting the static pressure measurement limit 116 as the static pressure indication 112. The altimeter 152 generates a standby altitude indication 114 based on the static pressure indication 112, as described with reference to FIG. 1A.

The static pressure indication generator 150, during the operation mode 130, performs a comparison of the airspeed measurement 118 and an airspeed threshold (e.g., the airspeed threshold 128 of FIG. 1A), at 202. The static pressure indication generator 150, in response to determining that the airspeed measurement 118 is less than or equal to the airspeed threshold (e.g., the airspeed threshold 128), continues to output the static pressure measurement 120 as the static pressure indication 112 and continues to compare the airspeed measurement 118 and the airspeed threshold (e.g., the airspeed threshold 128). For example, the static pressure indication generator 150 performs the comparison of the airspeed measurement 118 and the threshold continuously or at various time intervals (e.g., periodic time intervals).

Alternatively, the static pressure indication generator 150, during the operation mode 130, based on determining that the airspeed measurement 118 is greater than the airspeed threshold (e.g., the airspeed threshold 128), at 202, activates the operation mode selector 108 (e.g., to move the switch from the first position to a second position) to transition from the operation mode 130 to the operation mode 132 as the selected operation mode 140 and initiates a determination of whether the condition 134 is satisfied. While the condition 134 is not satisfied, the operation mode 132 remains as the selected operation mode 140.

During the operation mode 132, the static pressure indication generator 150 refrains from updating the static pressure measurement limit 116, and performs the minimum value select 206 to select a lower one of the static pressure measurement limit 116 or the static pressure measurement 120 as the static pressure indication 112. To illustrate, during the operation mode 132, performing the minimum value select 206 corresponds to performing a comparison of the static pressure measurement limit 116 (e.g., a stored value) and the static pressure measurement 120 (e.g., a detected value), and a lower one of the static pressure measurement limit 116 or the static pressure measurement 120 is output as the static pressure indication 112. The altimeter 152 generates a standby altitude indication 114 based on the static pressure indication 112, as described with reference to FIG. 1A.

In FIG. 2, the static pressure indication generator 150 determines whether the condition 134 is satisfied, at 214, based on determining whether an altitude change is greater than a change threshold, at 210, or whether a threshold time (e.g., 60 seconds) has elapsed since transitioning to the operation mode 132, at 212. For example, the static pressure indication generator 150 determines the altitude change (e.g., a difference) between a first altitude corresponding to the static pressure measurement limit 116 and the standby altitude indication 114.

According to some implementations, the static pressure indication generator 150 generates a first input having a first value (e.g., 0) in response to determining that the altitude change is less than the change threshold. Alternatively, the static pressure indication generator 150 generates the first input having a second value (e.g., 1) in response to determining that the altitude change is greater than or equal to the change threshold. According to some implementations, the static pressure indication generator 150 generates a second input having a first value (e.g., 0) in response to determining that a threshold time (e.g., 60 seconds) has not elapsed since the transition to the operation mode 132. Alternatively, the static pressure indication generator 150 generates the second input having a second value (e.g., 1) in response to determining that the threshold time has elapsed since the transition to the operation mode 132. The static pressure indication generator 150, based on determining that the first input has the second value, the second input has the second value, or both, determines that the condition 134 is satisfied. The static pressure indication generator 150, in response to determining that the condition 134 is satisfied, activates the operation mode selector 108 to (e.g., switch from the second position to the first position) to transition from the operation mode 132 to the operation mode 130.

It should be understood that determining whether the condition 134 is satisfied based on the altitude change, the threshold time, or both, is provided as an illustrative example. The static pressure indication generator 150 can determine whether the condition 134 is satisfied based on various comparisons. According to some examples, the static pressure indication generator 150 can determine that the condition 134 is satisfied based on determining that both comparisons are true, e.g., that the altitude change is greater than the threshold and that the threshold time has elapsed.

According to some examples, the static pressure indication generator 150 can determine whether the condition 134 is satisfied solely based on the altitude change. According to some examples, the static pressure indication generator 150 can determine whether the condition 134 is satisfied solely based on the threshold time having elapsed since transitioning to the operation mode 132. According to some examples, the static pressure indication generator 150 determines a static pressure change based on a comparison of (e.g., a difference between) the static pressure indication 112 and the static pressure measurement limit 116, and determines whether the condition 134 is satisfied based at least in part on whether the static pressure change satisfies (e.g., is less than) a change threshold.

A technical advantage of switching to the operation mode 132 when the airspeed measurement 118 is greater than the airspeed threshold 128 can include preventing output of the static pressure indication 112 based on the static pressure measurement 120 that is increased due to ground effect, thereby increasing accuracy of the standby altitude indication 114. Increasing accuracy of the altimeter 152 can help pilots to maintain situational awareness and reduce the likelihood of a potentially hazardous high-speed rejected takeoff. According to some implementations, the altimeter 152 generates the standby altitude indication 114 solely based on one or more airspeed measurements 118 obtained from an airspeed sensor of the sensors 110 of FIG. 1A, one or more static pressure measurements 120 obtained from a static pressure sensor of the sensors 110 of FIG. 1A, or a combination thereof. For example, the standby altitude indication 114 is not based on any additional sensor data. The altimeter 152 thus retains the simplicity associated with a standby altimeter while providing more accurate standby altitude indications 114.

Figure 3:
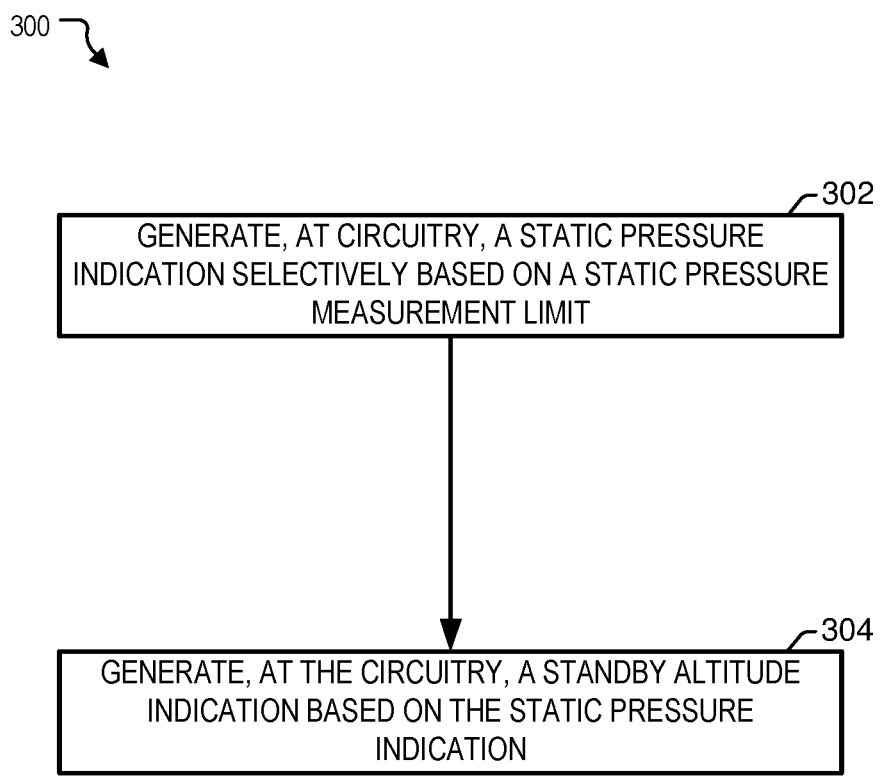
FIG. 3 is a diagram that illustrates a flow chart of an example of a method of generating a static pressure indication of the aircraft of FIG. 1A.

Referring to FIG. 3, an example of a method 300 of generating a static pressure indication is shown. In a particular aspect, one or more operations of the method 300 are performed by at least one of the static pressure indication generator 150, the altimeter 152, the aircraft data circuitry 106, the aircraft 104, the system 100 of FIG. 1A, or a combination thereof.

The method 300 includes generating, at circuitry, a static pressure indication selectively based on a static pressure measurement limit, at 302. For example, the static pressure indication generator 150 generates the static pressure indication 112 selectively based on the static pressure measurement limit 116, as described with reference to FIGS. 1A-2. To illustrate, the static pressure indication generator 150, during the operation mode 130, generates the static pressure indication 112 independently of the static pressure measurement limit 116 and, during the operation mode 132, generates the static pressure indication 112 based on the static pressure measurement limit 116.

The method 300 also includes generating, at the circuitry, a standby altitude indication based on the static pressure indication, at 304. For example, the altimeter 152 generates the standby altitude indication 114 based on the static pressure indication 112, as described with reference to FIG. 1A.

A technical advantage of switching to the operation mode 132 can include preventing output of the static pressure indication 112 based on the static pressure measurement 120 that is increased due to ground effect, thereby increasing accuracy of the standby altitude indication 114. Increasing accuracy of the altimeter 152 can help pilots to maintain situational awareness and reduce the likelihood of a potentially hazardous high-speed rejected takeoff.

Figure 4:
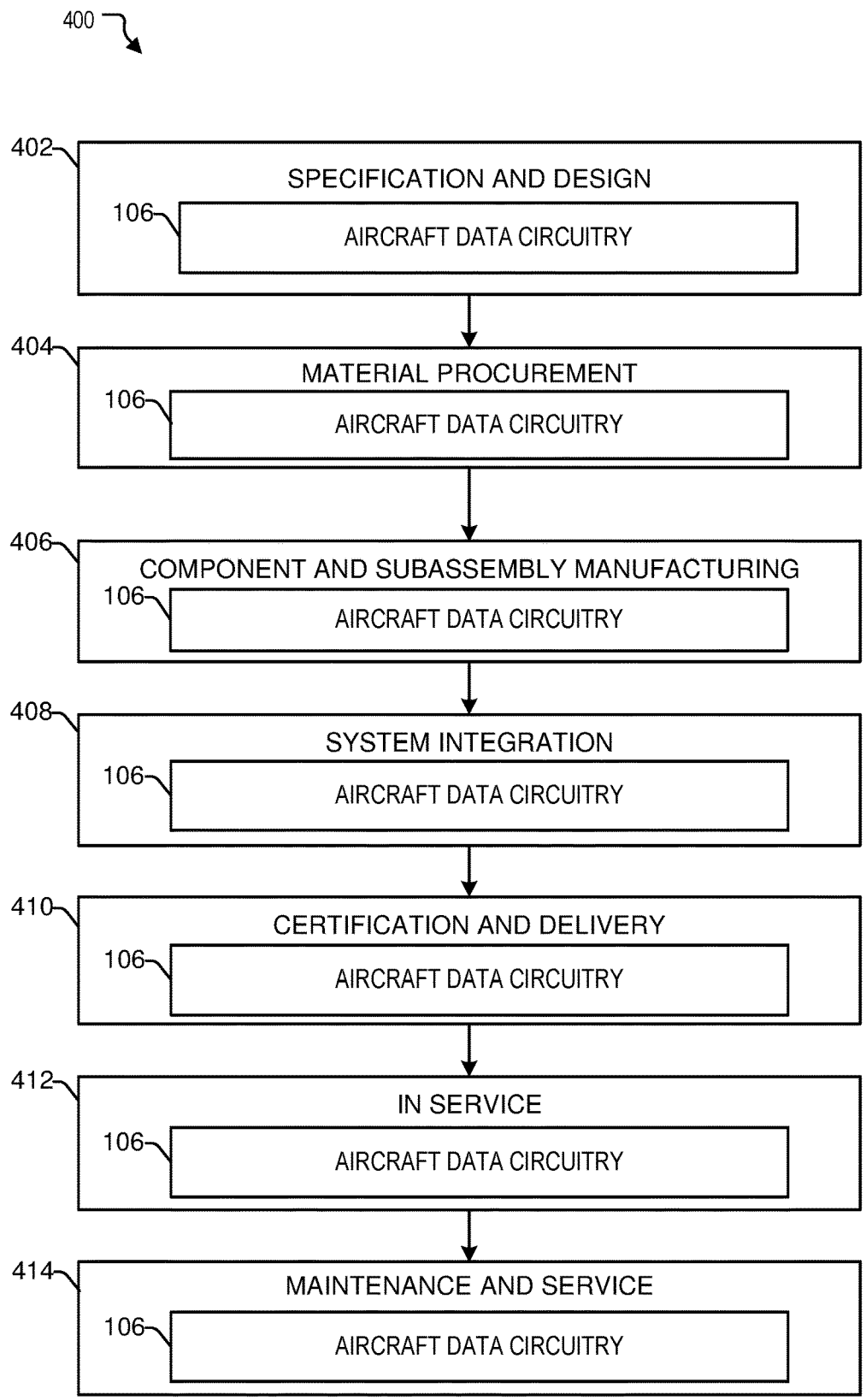
FIG. 4 is a flowchart illustrating an example of a life cycle of the aircraft of FIG. 1A.

Referring to FIG. 4, a flowchart illustrative of a life cycle of an aircraft that includes aircraft data circuitry is shown and designated 400. During pre-production, the exemplary method 400 includes, at 402, specification and design of an aircraft, such as the aircraft 104 described with reference to FIG. 1A. During specification and design of the aircraft, the method 400 may include specification and design of the aircraft data circuitry 106. At 404, the method 400 includes material procurement, which may include procuring materials for the aircraft data circuitry 106.

During production, the method 400 includes, at 406, component and subassembly manufacturing and, at 408, system integration of the aircraft. For example, the method 400 may include component and subassembly manufacturing of the aircraft data circuitry 106 and system integration of the aircraft data circuitry 106. At 410, the method 400 includes certification and delivery of the aircraft and, at 412, placing the aircraft in service. Certification and delivery may include certification of the aircraft data circuitry 106 to place the aircraft data circuitry 106 in service. While in service by a customer, the aircraft may be scheduled for routine maintenance and service (which may also include modification, reconfiguration, refurbishment, and so on). At 414, the method 400 includes performing maintenance and service on the aircraft, which may include performing maintenance and service on the aircraft data circuitry 106.

Each of the processes of the method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 5:
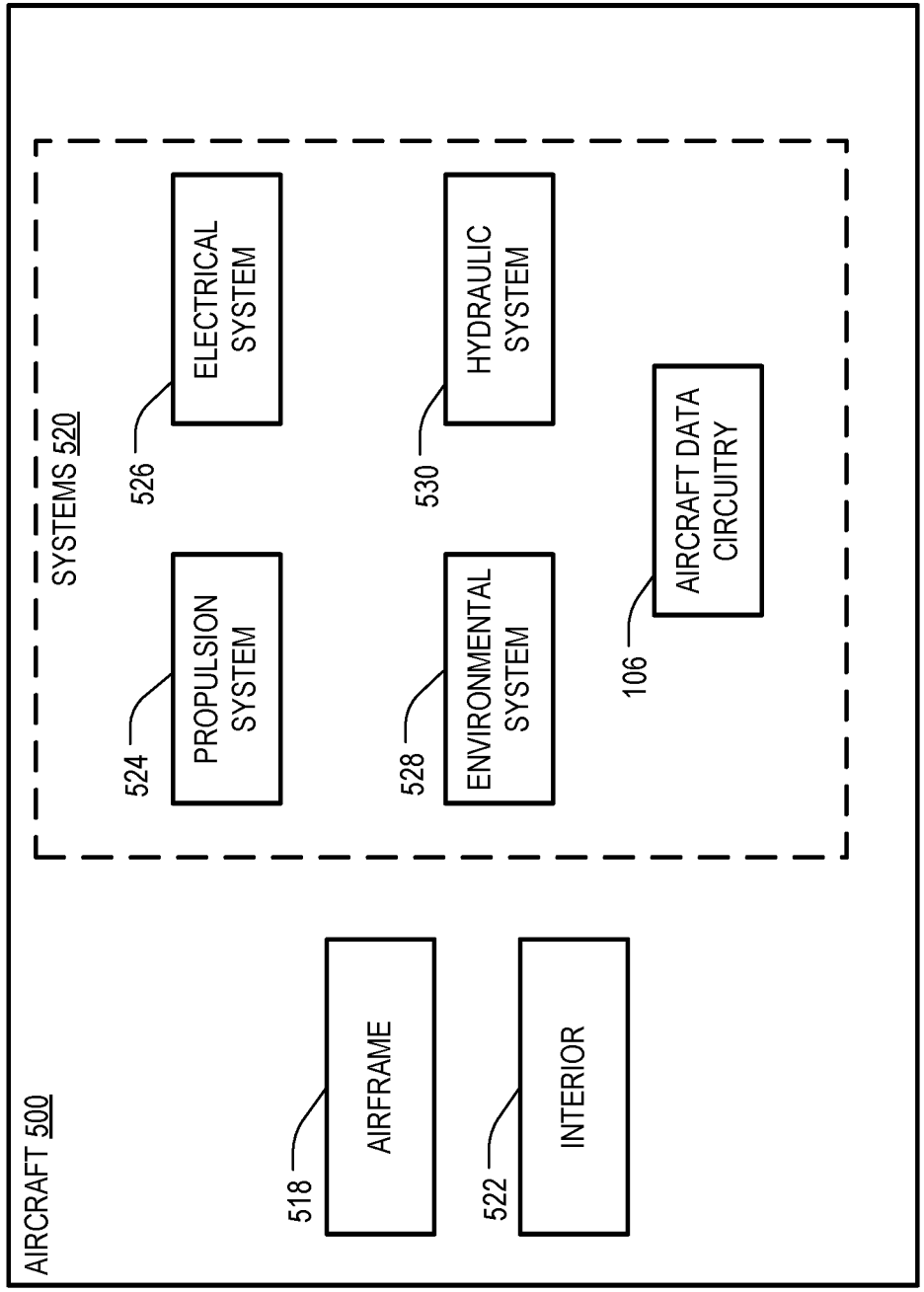
FIG. 5 is a block diagram of a particular implementation of the aircraft of FIG. 1A.

Aspects of the disclosure can be described in the context of an example of a vehicle. A particular example of a vehicle is an aircraft 500 as shown in FIG. 5. In some aspects, the aircraft 500 corresponds to the aircraft 104 of FIG. 1A.

In the example of FIG. 5, the aircraft 500 includes an airframe 518 with a plurality of systems 520 and an interior 522. Examples of the plurality of systems 520 include one or more of a propulsion system 524, an electrical system 526, an environmental system 528, a hydraulic system 530, and the aircraft data circuitry 106. Any number of other systems may be included.

FIG. 6 is a block diagram of a computing environment 600 including a computing device 610 configured to support aspects of computer-implemented methods and computer-executable program instructions (or code) according to the present disclosure. For example, the computing device 610, or portions thereof, is configured to execute instructions to initiate, perform, or control one or more operations described with reference to FIGS. 1A-5.

The computing device 610 includes one or more processors 620. The processor(s) 620 are configured to communicate with system memory 630, one or more storage devices 640, one or more input/output interfaces 650, one or more communications interfaces 660, or any combination thereof. The system memory 630 includes volatile memory devices (e.g., random access memory (RAM) devices), nonvolatile memory devices (e.g., read-only memory (ROM) devices, programmable read-only memory, and flash memory), or both. The system memory 630 stores an operating system 632, which may include a basic input/output system for booting the computing device 610 as well as a full operating system to enable the computing device 610 to interact with users, other programs, and other devices. The system memory 630 stores system (program) data 636, such as data used or generated by the aircraft data circuitry 106, or a combination thereof.

The system memory 630 includes one or more applications 634 (e.g., sets of instructions) executable by the processor(s) 620. As an example, the one or more applications 634 include instructions executable by the processor(s) 620 to initiate, control, or perform one or more operations described with reference to FIGS. 1A-5. To illustrate, the one or more applications 634 include instructions executable by the processor(s) 620 to initiate, control, or perform one or more operations described with reference to the aircraft data circuitry 106, or a combination thereof.

In a particular implementation, the system memory 630 includes a non-transitory, computer readable medium storing the instructions that, when executed by the processor(s) 620, cause the processor(s) 620 to initiate, perform, or control operations to aid in aircraft static pressure indication generation. The operations include generating, at circuitry (e.g., the static pressure indication generator 150, the aircraft data circuitry 106 of FIG. 1A), a static pressure indication (e.g., the static pressure indication 112 of FIG. 1A) selectively based on a static pressure measurement limit (e.g., the static pressure measurement limit 116 of FIG. 1A). The operations also includes generating, at the circuitry, a standby altitude indication (e.g., the standby altitude indication 114 of FIG. 1A) based on the static pressure indication.

The one or more storage devices 640 include nonvolatile storage devices, such as magnetic disks, optical disks, or flash memory devices. In a particular example, the storage devices 640 include both removable and non-removable memory devices. The storage devices 640 are configured to store an operating system, images of operating systems, applications (e.g., one or more of the applications 634), and program data (e.g., the program data 636). In a particular aspect, the system memory 630, the storage devices 640, or both, include tangible computer-readable media. In a particular aspect, one or more of the storage devices 640 are external to the computing device 610.

The one or more input/output interfaces 650 enable the computing device 610 to communicate with one or more input/output devices 670 to facilitate user interaction. For example, the one or more input/output interfaces 650 can include a display interface, an input interface, or both. For example, the input/output interface 650 is adapted to receive input from a user, to receive input from another computing device, or a combination thereof. In some implementations, the input/output interface 650 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 670 includes one or more user interface devices and displays, including some combination of buttons, keyboards, pointing devices, displays, speakers, microphones, touch screens, and other devices.

The processor(s) 620 are configured to communicate with devices or controllers 680 via the one or more communications interfaces 660. For example, the one or more communications interfaces 660 can include a network interface. The devices or controllers 680 can include, for example, the sensors 110 of FIG. 1A, one or more other devices, or any combination thereof.

In conjunction with the described systems and methods, an apparatus for aiding in aircraft static pressure indication generation is disclosed that includes means for generating a static pressure indication selectively based on a static pressure measurement limit. In some implementations, the means for generating the static pressure indication corresponds to the operation mode selector 108, the static pressure indication generator 150, the aircraft data circuitry 106, the sensors 110, the system 100 of FIG. 1A, the computing device 610, the processor(s) 620, one or more other circuits or devices configured to generate a static pressure indication selectively based on a static pressure measurement limit, or a combination thereof.

The apparatus also includes means for generating a standby altitude indication based on the static pressure indication. For example, the means for generating the standby altitude can correspond to the altimeter 152, the aircraft data circuitry 106, the system 100 of FIG. 1A, the computing device 610, the processor(s) 620, one or more other devices configured to generate a standby altitude indication based on the static pressure indication, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1A-6. In some implementations, part or all of one or more of the operations or methods of FIGS. 1A-6 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, a device includes circuitry configured to during a first operation mode, generate a static pressure indication independently of a static pressure measurement limit; during a second operation mode, generate the static pressure indication based on the static pressure measurement limit; and generate a standby altitude indication based on the static pressure indication.

Example 2 includes the device of Example 1, wherein, during the second operation mode, the static pressure measurement limit corresponds to a static pressure ceiling of the static pressure indication, and wherein the standby altitude indication has an altitude floor corresponding to the static pressure ceiling.

Example 3 includes the device of Example 1 or Example 2, wherein the circuitry includes one or more processors.

Example 4 includes the device of any of Examples 1 to 3, wherein the circuitry includes analog circuitry.

Example 5 includes the device of any of Examples 1 to 4, wherein the circuitry is integrated in a line replaceable unit (LRU) configured to provide standby flight data indications.

Example 6 includes the device of any of Examples 1 to 5, wherein the circuitry is configured to, based on determining that an airspeed measurement indicates a greater than an airspeed threshold, transition from the first operation mode to the second operation mode.

Example 7 includes the device of any of Examples 1 to 6, wherein the circuitry is configured to, based on determining that a condition is satisfied, transition from the second operation mode to the first operation mode.

Example 8 includes the device of Example 7, wherein the circuitry is configured to determine that the condition is satisfied based on detecting that a threshold time has elapsed since transitioning to the second operation mode.

Example 9 includes the device of Example 7 or Example 8, wherein the circuitry is configured to determine that the condition is satisfied based on a comparison of a threshold and a difference between a static pressure measurement and the static pressure measurement limit.

Example 10 includes the device of any of Examples 1 to 9, wherein the circuitry is configured to obtain one or more static pressure measurements from a static pressure sensor; obtain one or more airspeed measurements from an airspeed sensor; and generate the static pressure indication based solely on the one or more static pressure measurements and the one or more airspeed measurements.

Example 11 includes the device of any of Examples 1 to 10, wherein the circuitry is configured to, during the first operation mode, update the static pressure measurement limit based on a predetermined count of most recent static pressure measurements.

Example 12 includes the device of any of Examples 1 to 11, wherein the circuitry is configured to, during the second operation mode, select a lower one of the static pressure measurement limit or a static pressure measurement as the static pressure indication.

According to Example 13, an aircraft includes circuitry configured to during a first operation mode, generate a static pressure indication independently of a static pressure measurement limit; during a second operation mode, generate the static pressure indication based on the static pressure measurement limit; and generate a standby altitude indication based on the static pressure indication.

Example 14 includes the aircraft of Example 13, wherein the circuitry includes one or more processors.

Example 15 includes the aircraft of Example 13 or Example 14, wherein the circuitry includes analog circuitry.

Example 16 includes the aircraft of any of Examples 13 to 15, wherein the circuitry is integrated in a line replaceable unit (LRU) configured to provide standby flight data indications.

Example 17 includes the aircraft of any of Examples 13 to 16, wherein, during the second operation mode, the static pressure measurement limit corresponds to a static pressure ceiling of the static pressure indication, and wherein the standby altitude indication has an altitude floor corresponding to the static pressure ceiling.

According to Example 18, a method includes generating, at circuitry, a static pressure indication selectively based on a static pressure measurement limit; and generating, at the circuitry, a standby altitude indication based on the static pressure indication.

Example 19 includes the method of Example 18, wherein, during the second operation mode, the static pressure measurement limit corresponds to a static pressure ceiling of the static pressure indication, and wherein the standby altitude indication has an altitude floor corresponding to the static pressure ceiling.

Example 20 includes the method of Example 18 or Example 19, wherein the circuitry includes one or more processors.

Example 21 includes the method of any of Examples 18 to 20, wherein the circuitry includes analog circuitry.

Example 22 includes the method of any of Examples 18 to 21, wherein the circuitry is integrated in a line replaceable unit (LRU) configured to provide standby flight data indications.

Example 23 includes the method of any of Examples 18 to 22, further including, based on determining that an airspeed measurement indicates a greater than an airspeed threshold, transitioning from the first operation mode to the second operation mode.

Example 24 includes the method of any of Examples 18 to 23, further including, based on determining that a condition is satisfied, transitioning from the second operation mode to the first operation mode.

Example 25 includes the method of Example 24, further including determining that the condition is satisfied based on detecting that a threshold time has elapsed since transitioning to the second operation mode.

Example 26 includes the method of Example 24 or Example 25, further including determining that the condition is satisfied based on a comparison of a threshold and a difference between a static pressure measurement and the static pressure measurement limit.

Example 27 includes the method of any of Examples 18 to 26, further including: obtaining one or more static pressure measurements from a static pressure sensor; obtaining one or more airspeed measurements from an airspeed sensor; and generating the static pressure indication based solely on the one or more static pressure measurements and the one or more airspeed measurements.

Example 28 includes the method of any of Examples 18 to 27, further including, during the first operation mode, updating the static pressure measurement limit based on a predetermined count of most recent static pressure measurements.

Example 29 includes the method of any of Examples 18 to 28, further including, during the second operation mode, selecting a lower one of the static pressure measurement limit or a static pressure measurement as the static pressure indication.

Example 30 includes the method of any of Examples 18 to 29, wherein, during a first operation mode, the static pressure indication is generated independently of the static pressure measurement limit.

Example 31 includes the method of any of Examples 18 to 30, wherein, during a second operation mode, the static pressure indication is generated based on the static pressure measurement limit.

According to Example 32, a device includes: a memory configured to store instructions; and a processor configured to execute the instructions to perform the method of any of Example 18 to 31.

According to Example 33, a non-transitory computer-readable medium stores instructions that, when executed by a processor, cause the processor to perform the method of any of Example 18 to Example 31.

According to Example 34, an apparatus includes means for carrying out the method of any of Example 18 to Example 31.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
   circuitry configured to:
   during a first operation mode, generate a static pressure indication independently of a static pressure measurement limit;
   during a second operation mode, generate the static pressure indication based on the static pressure measurement limit; and
   generate a standby altitude indication based on the static pressure indication.

2. The device of claim 1, wherein, during the second operation mode, the static pressure measurement limit corresponds to a static pressure ceiling of the static pressure indication, and wherein the standby altitude indication has an altitude floor corresponding to the static pressure ceiling.

3. The device of claim 1, wherein the circuitry includes one or more processors.

4. The device of claim 1, wherein the circuitry includes analog circuitry.

5. The device of claim 1, wherein the circuitry is integrated in a line replaceable unit (LRU) configured to provide standby flight data indications.

6. The device of claim 1, wherein the circuitry is configured to, based on determining that an airspeed measurement indicates a greater than an airspeed threshold, transition from the first operation mode to the second operation mode.

7. The device of claim 1, wherein the circuitry is configured to, based on determining that a condition is satisfied, transition from the second operation mode to the first operation mode.

8. The device of claim 7, wherein the circuitry is configured to determine that the condition is satisfied based on detecting that a threshold time has elapsed since transitioning to the second operation mode.

9. The device of claim 7, wherein the circuitry is configured to determine that the condition is satisfied based on a comparison of a threshold and a difference between a static pressure measurement and the static pressure measurement limit.

10. The device of claim 1, wherein the circuitry is configured to:
    obtain one or more static pressure measurements from a static pressure sensor;
    obtain one or more airspeed measurements from an airspeed sensor; and
    generate the static pressure indication based solely on the one or more static pressure measurements and the one or more airspeed measurements.

11. The device of claim 1, wherein the circuitry is configured to, during the first operation mode, update the static pressure measurement limit based on a predetermined count of most recent static pressure measurements.

12. The device of claim 1, wherein the circuitry is configured to, during the second operation mode, select a lower one of the static pressure measurement limit or a static pressure measurement as the static pressure indication.

13. An aircraft comprising:
    circuitry configured to:
    during a first operation mode, generate a static pressure indication independently of a static pressure measurement limit;
    during a second operation mode, generate the static pressure indication based on the static pressure measurement limit; and
    generate a standby altitude indication based on the static pressure indication.

14. The aircraft of claim 13, wherein the circuitry includes one or more processors.

15. The aircraft of claim 13, wherein the circuitry includes analog circuitry.

16. The aircraft of claim 13, wherein the circuitry is integrated in a line replaceable unit (LRU) configured to provide standby flight data indications.

17. The aircraft of claim 13, wherein, during the second operation mode, the static pressure measurement limit corresponds to a static pressure ceiling of the static pressure indication, and wherein the standby altitude indication has an altitude floor corresponding to the static pressure ceiling.

18. A method comprising:
    generating, at circuitry, a static pressure indication selectively based on a static pressure measurement limit; and
    generating, at the circuitry, a standby altitude indication based on the static pressure indication.

19. The method of claim 18, wherein, during a first operation mode, the static pressure indication is generated independently of the static pressure measurement limit.

20. The method of claim 18, wherein, during a second operation mode, the static pressure indication is generated based on the static pressure measurement limit.

* * * * *